United States Patent
Asai et al.

(10) Patent No.: US 9,002,861 B2
(45) Date of Patent: Apr. 7, 2015

(54) MATCHING DEVICE AND COMPUTER-READABLE STORAGE MEDIUM

(75) Inventors: Tatsuya Asai, Kawasaki (JP); Hiroaki Morikawa, Kawasaki (JP); Shinichiro Tago, Kawasaki (JP); Hiroya Inakoshi, Kawasaki (JP); Nobuhiro Yugami, Kawasaki (JP); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 13/432,319

(22) Filed: Mar. 28, 2012

(65) Prior Publication Data

US 2012/0290593 A1    Nov. 15, 2012

(30) Foreign Application Priority Data

May 12, 2011    (JP) ................ 2011-107354

(51) Int. Cl.
*G06F 17/30* (2006.01)
(52) U.S. Cl.
CPC .............. *G06F 17/30516* (2013.01)
(58) Field of Classification Search
CPC ... G06F 2201/86; G06F 17/27; G06F 17/272; G06F 17/30516; G06F 17/277; G06F 17/30985; Y10S 707/99936
USPC .......................... 707/755; 719/318
See application file for complete search history.

(56) References Cited

U.S. PATENT DOCUMENTS

| 2010/0017397 A1* | 1/2010 | Koyanagi et al. ........... 707/5 |
| 2010/0057735 A1* | 3/2010 | Srinivasan et al. ......... 707/6 |

OTHER PUBLICATIONS

A. Demers et al., "Cayuga: A General Purpose Event Monitoring System," CIDR 2007; pp. 412-422.
J. Agrawal et al. "Efficient Pattern Matching over Event Streams", SIGMOD; Jun. 9-12, 2008.

* cited by examiner

*Primary Examiner* — Pierre Vital
*Assistant Examiner* — Evan Aspinwall
(74) *Attorney, Agent, or Firm* — Fujitsu Patent Center

(57) ABSTRACT

A matching device builds a parse tree from an event pattern. The matching device builds an automaton by, while traversing the parse tree, joining child nodes of an AND node in parallel to the AND node and joining child nodes of an OR node in parallel to the OR node. The matching device performs matching of determining whether an event stream includes the event pattern by comparing the event stream with the automaton.

10 Claims, 17 Drawing Sheets

| EVENT STREAM | y | z | a | z | y | x | z | c | z | z | b | e | z | y |
|---|---|---|---|---|---|---|---|---|---|---|---|---|---|---|
| TIME | 1 | 2 | 3 | 4 | 5 | 6 | 7 | 8 | 9 | 10 | 11 | 12 | 13 | 14 |

| STATE NUMBER | 1 |
|---|---|
| STATE TYPE | INITIAL STATE |
| TRANSITION TYPE | EVENT a |
| POINTER TO TRANSITION DESTINATION NODE | POSITIONAL INFORMATION ABOUT NODE WHOSE STATE NUMBER IS 2 |
| ... | ... |
| EVENT SET | — |

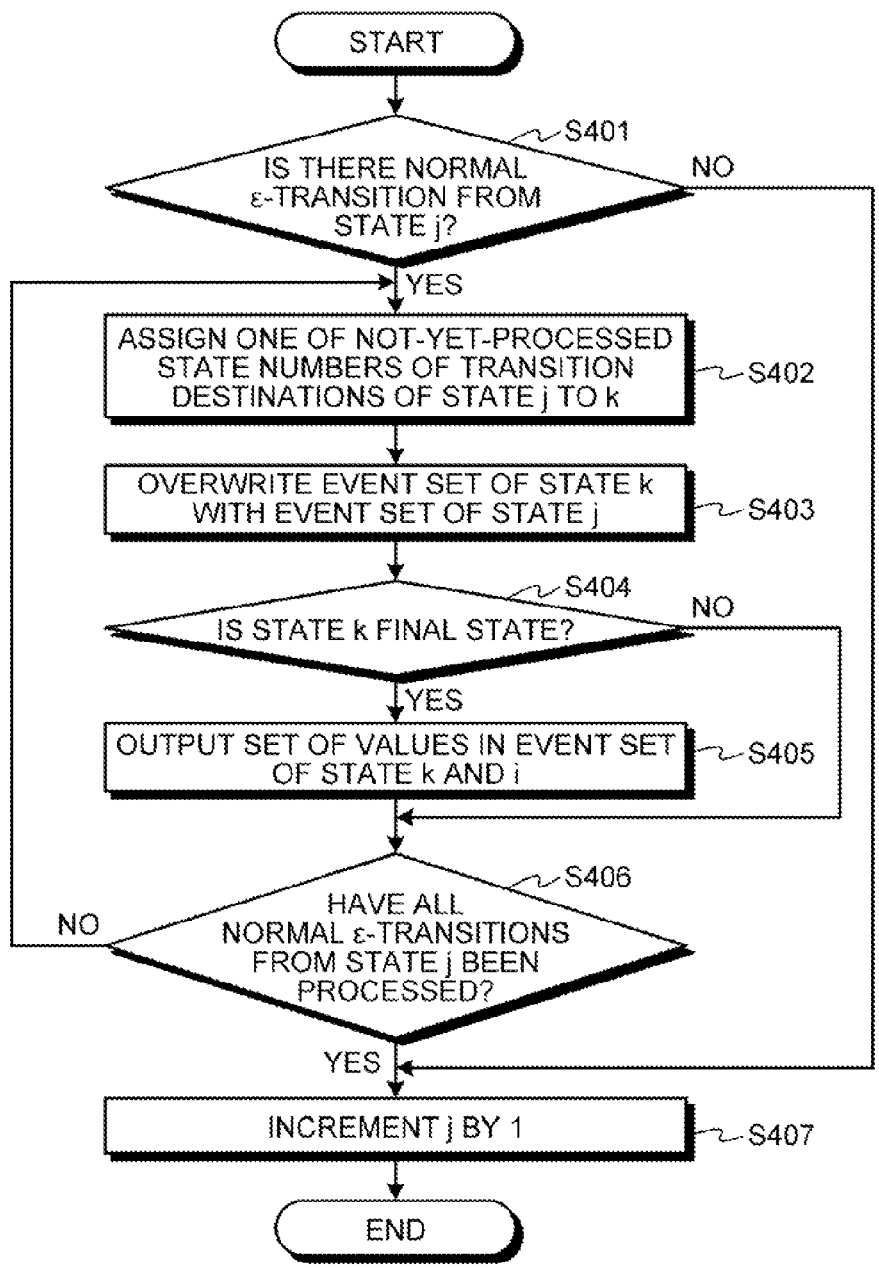

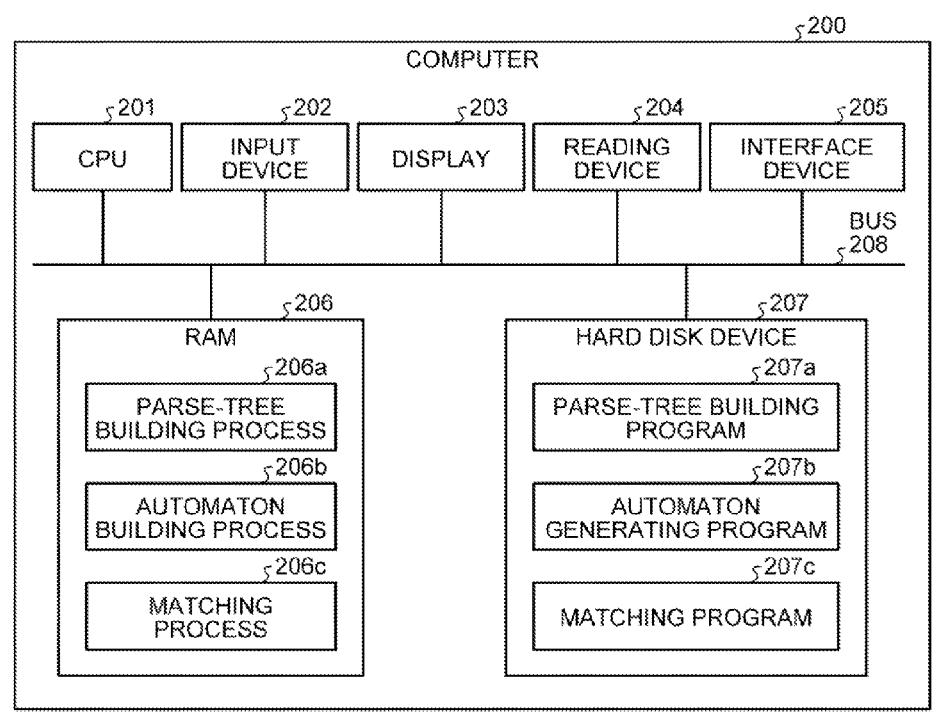

| EVENT | DESCRIPTION |
|---|---|
| a | ISSUANCE OF SLIP BY PERSON IN CHARGE |
| b | APPROVAL BY RESPONSIBLE DEPARTMENT CHIEF B |
| c | APPROVAL BY RESPONSIBLE DEPARTMENT CHIEF C |
| d | APPROVAL BY DEPARTMENT CHIEF D |
| e | APPROVAL BY DIRECTOR E |
| x | APPROVAL BY SECTION CHIEF X |
| y | LOGIN REQUEST FROM USER |
| z | OTHER PROCESS |
| ... | ... | ant application is based upon and claims the benefit of# MATCHING DEVICE AND COMPUTER-READABLE STORAGE MEDIUM

CROSS-REFERENCE TO RELATED APPLICATION

This application is based upon and claims the benefit of priority of the prior Japanese Patent Application No. 2011-107354, filed on May 12, 2011, the entire contents of which are incorporated herein by reference.

FIELD

The embodiment discussed herein is directed to matching devices and the like.

BACKGROUND

As network technology and sensor technology develop and proliferate, event stream processing aimed at real-time processing of sequences of events that occur in high volume every moment has received attention. A sequence of events is referred to as an event stream hereinafter. In the field of event stream processing, importance is placed on event-pattern matching technology of detecting a pattern of arrival order of events, and various methods have been proposed.

It is desired that event pattern matching has, for instance, three features described below. A first one of the features is described. It is preferable for the event pattern matching to ignore a noise event mixed in an event stream while performing matching. Meanwhile, a noise event denotes an event other than target events to be subjected to matching.

A second one of the features is described. It is preferable for the event pattern matching to perform efficient matching of various pattern expressions, such as a conjunction pattern and a disjunction pattern. For instance, a conjunction pattern of an event A and an event B is denoted as "A&B." If both the events A and B are contained in an event stream in no particular order, "A&B" has been matched. A disjunction pattern of an event A and an event B is denoted as "AvB." If any one of the events A and B is contained in an event stream, "AvB" has been matched.

A third one of the features is described. It is preferable for the event pattern matching to detect not only matching completion time of event pattern matching on an event stream in real time but also matching start time of event pattern matching on the event stream in real time.

Next, an example of a conventional technique for event pattern matching is described. FIG. 26 is a diagram for explaining the conventional technique according to A. Demers, et al., "Cayuga: A General Purpose Event Monitoring System," Proc. CIDR, 2007. As illustrated in FIG. 26, an event stream 10 contains events "a", "b", "c", "d", "e", "x", "y", and "z". FIG. 27 is a diagram where events and descriptions about the events are associated with each other. As illustrated in FIG. 27, the event a represents issuance of a slip by a person in charge; the event b represents approval by a responsible department chief B; the event c represents approval by a responsible department chief C; the event d represents approval by a department chief D. The event e represents approval by a director E; the event x represents approval by a section chief X; the event y represents a login request from a user; the event z represents other process.

Assumed herein is a system that detects in real time only a slip that is processed through a proper process procedure and solicits settlement from a president. The proper process procedure is assumed as an event pattern P=(a, ((b&c)vd), e). This event pattern P denotes that patterns 1, 2, and 3 below are executed in order. The patterns 1, 2, and 3 may contain a noise event(s) therebetween.

The pattern 1 is issuance of a slip by a person in charge. The pattern 1 corresponds to "a" in the event pattern P.

The pattern 2 is execution of any one of sub-patterns 1 and 2 below. The sub-pattern 1 is approval by both the responsible department chief B and the responsible department chief C in no particular order. The sub-pattern 2 is approval by the department chief D. The pattern 2 corresponds to "(b&c)vd)" in the event pattern P.

The pattern 3 is approval by the director E. The pattern 3 corresponds to "e" in the event pattern P.

With a conventional technique according to J. Agrawal, et al., "Efficient Pattern Matching over Event Streams," *Proc. SIGMOD*, 2008, the event pattern P is compared with the event stream 10 illustrated in FIG. 26. As a result, matching of the event a is performed at a position 10a in the event stream 10, and matching of the event c is performed at a position 10b. Furthermore, matching of the event b is performed at a position 10c, and matching of the event e is performed at a position 10d; hence, matching of the event pattern P is completed. According to the conventional technique, a settlement request notification is transmitted to the president when the matching is completed.

Meanwhile, in the conventional technique, comparison between an event pattern and an event stream is performed by building and utilizing a nondeterministic finite automaton (NFA) that corresponds to the event pattern. A nondeterministic finite automaton is abbreviated as an automaton hereinafter. FIG. 28 is a diagram illustrating a conventional automaton built from an event pattern. An automaton 20 illustrated in FIG. 28 is an automaton corresponding to the event pattern P=(a, ((b&c)vd), e).

The automaton 20 joins nodes 21, 22, 23a to 23f, 24a to 24f, 25a to 25f, 26a to 26f, 27, and 28. With the conventional technique, all the combinations of occurrence order of "b," "c," and "d" are expressed with the nodes 23a to 23f, 24a to 24f, 25a to 25f, and 26a to 26f to adapt to the conjunction pattern "b&c&d" of the event pattern P. Occurrence of an event over an arrow invokes a node transition of the automaton 20. For instance, a transition from the node 21 to the node 22 is invoked by arrival at the position of the event a in the event stream.

Meanwhile, "ε" of the automaton 20 represents an ε-transition. For instance, when a transition from the node 21 to the node 22 is invoked, ε-transitions from the node 22 to the nodes 23a to 23f are invoked.

For instance, when an event stream is assumed as "a, b, c, d, and e," matching is completed by transitions in the order of the nodes 21, 22, 23a, 24a, 25a, 26a, 27, and 28 of the automaton 20.

However, the conventional technique described above is disadvantageous in being incapable of efficient event pattern matching by utilizing an automaton.

When an event pattern contains a conjunction pattern, as illustrated in FIG. 28, an automaton is to include all the combinations of occurrence order of events contained in the conjunction pattern, which is inefficient. For instance, when a conjunction pattern contains m events, the number of nodes is O(m!).

SUMMARY

According to an aspect of an embodiment of the invention, a matching device includes a parse-tree building unit that builds a parse tree based on an event pattern, the event pattern including a first pattern of a single event, a second pattern where every event of a plurality of events occurs in no particular order, and a third pattern where any one event of a plurality of events occurs, and representing an occurrence order of the first pattern, the second pattern, and the third pattern, by associating an event node corresponding to each event, an AND node representing a relationship between the events in the second pattern, and an OR node representing a relationship between the events of the third pattern together in a tree structure; an automaton building unit that builds an automaton by performing a process of joining child nodes of the AND node in parallel to the AND node and a process of joining child nodes of the OR node in parallel to the OR node while traversing the parse tree; and a matching unit that performs matching of determining whether an event stream that includes a plurality of event occurrence orders includes the event pattern by comparing the event stream with the automaton in succession, causing a transition to the AND node of the automaton to start after transitions from all transition source nodes which transit to the AND node have been invoked, and causing a transition to the OR node of the automaton to start after a transition from any one of transition source nodes which transit to the OR node has been invoked.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 23 is a flowchart illustrating a process procedure for a process related to the $\epsilon$-transition;

FIG. 24 is a diagram illustrating a result of comparison among time complexities and space complexities;

FIG. 25 is a diagram illustrating an example of a computer that executes a matching program;

DESCRIPTION OF EMBODIMENT

Preferred embodiments of the present invention will be explained with reference to accompanying drawings. Note that the embodiments are not intended to limit the scope of the present invention.

Figure 1:
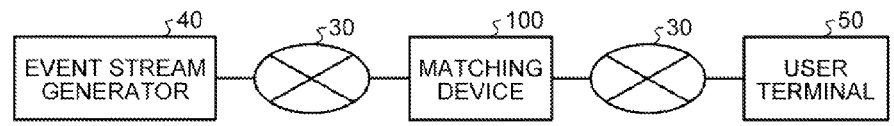
FIG. 1 is a diagram illustrating the configuration of a matching system according to an embodiment of the present invention.

An example configuration of a matching system according to an embodiment of the present invention will be described. FIG. 1 is a diagram illustrating the configuration of the matching system according to the present embodiment. As illustrated in FIG. 1, this matching system includes an event stream generator 40, a user terminal 50, and a matching device 100. The matching device 100 is connected to the event stream generator 40 and the user terminal 50 via a network 30.

The event stream generator 40 is a device that generates an event stream that contains a plurality of sequences of events. The event stream generator 40 transmits information about the event stream to the matching device 100.

The user terminal 50 is a device that transmits an event pattern to the matching device 100 and receives a matching result from the matching device 100.

The matching device 100 is a device that performs matching of determining whether an event pattern is contained in an event stream. The matching device 100 transmits a matching result to the user terminal 50.

Figure 2:
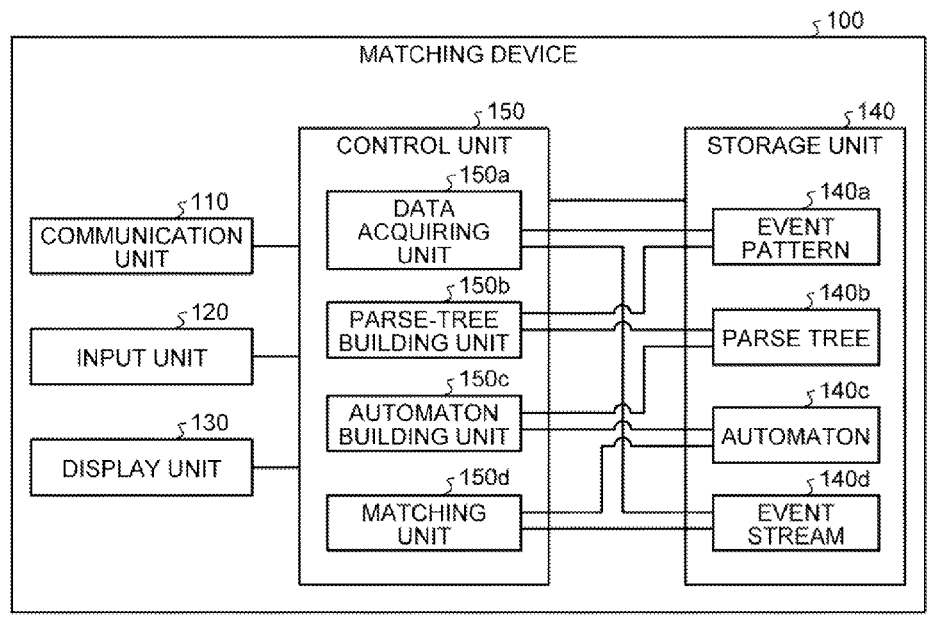
FIG. 2 is a functional block diagram illustrating the configuration of a matching device according to the embodiment.

The configuration of the matching device 100 illustrated in FIG. 1 will be described. FIG. 2 is a functional block diagram illustrating the configuration of the matching device according to the present embodiment. As illustrated in FIG. 2, the matching device 100 includes a communication unit 110, an input unit 120, a display unit 130, a storage unit 140, and a control unit 150.

The communication unit 110 is a processing unit that carries out data communications with the event stream generator 40 and the user terminal 50 via the network 30. The control unit 150, which will be described later, receives information about an event stream and an event pattern via the communication unit 110. The communication unit 110 can be embodied as a communication device, a communication card, or the like that carries out data communications using a predetermined communication protocol.

The input unit 120 is an input device for use by a user to enter various information pieces to the matching device 100. For instance, the input unit 120 can be embodied as a keyboard, a mouse, or a touch panel. The display unit 130 is a display device that displays various types of information. For instance, the display unit 130 can be embodied as a display or a touch panel.

The storage unit 140 stores an event pattern 140a, a parse tree 140b, an automaton 140c, and an event stream 140d. The storage unit 140 can be embodied as, for instance, a semiconductor memory device such as random access memory (RAM), read only memory (ROM), or flash memory, or a storage device such as a hard disk or an optical disk.

The event pattern 140a is an event pattern for use in matching against the event stream 140d. In the present embodiment, the event pattern 140a is assumed as, for example, P=(a, ((b&c)vd), e). Of this event pattern, a, b, c, d, and e correspond to the event a, the event b, the event c, the event d, and the event e, respectively.

Of an event pattern, "&" is a symbol denoting an operation of performing matching of all corresponding events in no particular order. For instance, "A&B" is a conjunction pattern where matching of each of the events A and B is to be performed in no particular order. "v" is a symbol denoting an operation of performing matching of at least one of corresponding events. For instance, "AvB" is a disjunction pattern where matching of at least one of the events A and B is to be performed.

Of an event pattern, "," denotes a delimiter of the pattern. Matching of an event pattern is performed in succession from a event on the left. For instance, when an event pattern is "P=a, ((b&c)vd), e," matching is performed in the order of "a," "(b&c)vd," and "e."

The parse tree 140b is a parse tree built from the event pattern 140a. The automaton 140c is a nondeterministic finite automaton built from the parse tree.

Figures 3, 4:
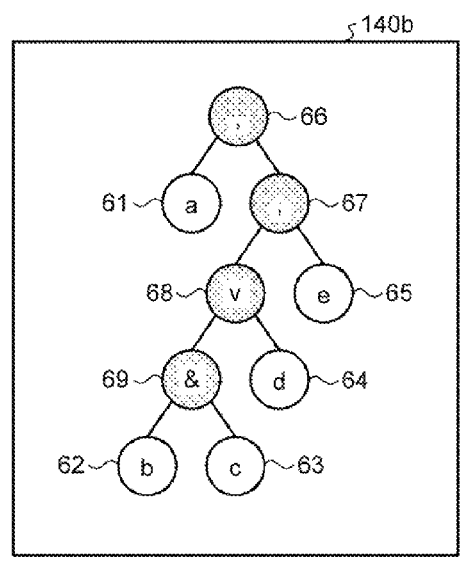
FIG. 3 is a diagram illustrating an example data structure of an event stream.
FIG. 4 is a diagram illustrating an example parse tree.

The event stream 140d is data that contains a sequence of a plurality of events. FIG. 3 is a diagram illustrating an example data structure of the event stream 140d. As illustrated in FIG. 3, the event stream 140d is stored such that the event stream representing the sequence of the events and times, at which the events have occurred, are associated with each other.

The control unit 150 includes a data acquiring unit 150a, a parse-tree building unit 150b, an automaton building unit 150c, and a matching unit 150d. For instance, the control unit 150 is embodied as an integrated device, such as an application specific integrated circuit (ASIC) or a field programmable gate array (FPGA). The control unit 150 can be embodied as, for instance, electric circuit such as a central processing unit (CPU) or a micro processing unit (MPU).

The data acquiring unit 150a is a processing unit that acquires an event stream from the event stream generator 40 and acquires an event pattern from the user terminal 50. The data acquiring unit 150a causes the storage unit 140 to store the event stream and the event pattern as the event pattern 140a and the event stream 140d, respectively.

The parse-tree building unit 150b is a processing unit that builds the parse tree 140b from the event pattern 140a. The parse-tree building unit 150b causes the storage unit 140 to store the built parse tree 140b.

When the event pattern is "P=(a, ((b&c)vd), e)," the parse-tree building unit 150b builds the parse tree illustrated in FIG. 4. FIG. 4 is a diagram illustrating an example parse tree. As illustrated in FIG. 4, the parse tree 140b includes nodes 61 to 69. Of the nodes, the nodes 61 to 65 are event nodes corresponding to "a," "b," "c," "d", and "e" of the event pattern 140a. The nodes 66 to 69 are computing nodes corresponding to symbols ",", ",", "v" and "&" of the event pattern 140a.

For instance, the parse-tree building unit 150b builds the parse tree 140b by setting computing nodes to nodes of the parse tree and joining corresponding event nodes to the computing nodes while traversing the event pattern 140a. The parse-tree building unit 150b may utilize any conventional technique to build the parse tree 140b from the event pattern 140a.

The automaton building unit 150c is a processing unit that builds the automaton 140c from the parse tree 140b. The automaton building unit 150c causes the storage unit 140 to store the built automaton 140c.

For instance, the automaton building unit 150c builds the automaton 140c by using the "Thompson automaton" construction method of a conventional technique described in G. Navarro and M. Raffinot "Flexible Pattern Matching in Strings," (Section 5), Cambridge University Press, 2002. The automaton construction method employed by the automaton building unit 150c is described below. FIG. 5 to FIG. 8 are diagrams for explaining the automaton construction method employed by the automaton building unit.

Figure 5:
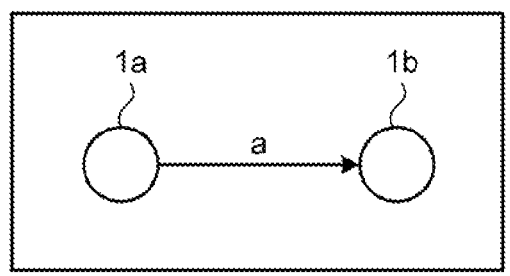
FIG. 5 is a first diagram for explaining an automaton construction method employed by an automaton building unit.

An automaton for a single event is illustrated in FIG. 5. FIG. 5 illustrates an automaton for a single event "P=a." The automaton building unit 150c builds an automaton that includes a node 1a and a node 1b joined together by a transition from the node 1a to the node 1b.

Figure 6:
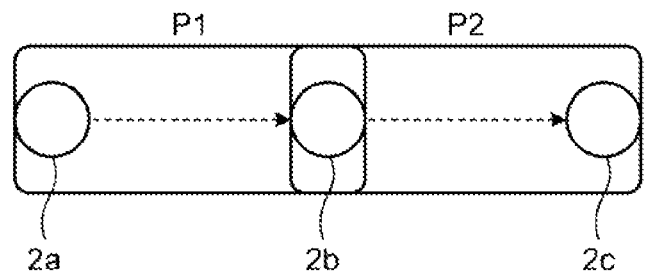
FIG. 6 is a second diagram for explaining the automaton construction method employed by the automaton building unit.

An automaton for a non-consecutive concatenation pattern is illustrated in FIG. 6. The non-consecutive concatenation pattern is an event pattern that includes a plurality of events and a noise event. FIG. 6 illustrates an automaton for a non-consecutive concatenation pattern P=(P1, P2). The automaton building unit 150c links an automaton A1 corresponding to a pattern P1 and an automaton A2 corresponding to a pattern P2 with a node 2b as illustrated in FIG. 6. The automaton building unit 150c builds the automaton, in which a transition from a node 2a to the node 2b is caused by the pattern P1, while a transition from the node 2b to a node 2c is caused by the pattern P2.

The automaton illustrated in FIG. 6 is an automaton that performs non-consecutive matching. More specifically, this automaton recognize that P=(P1, P2) has matched even when P2 is matched after an event sequence has arrived after P1 has been matched.

Figure 7:
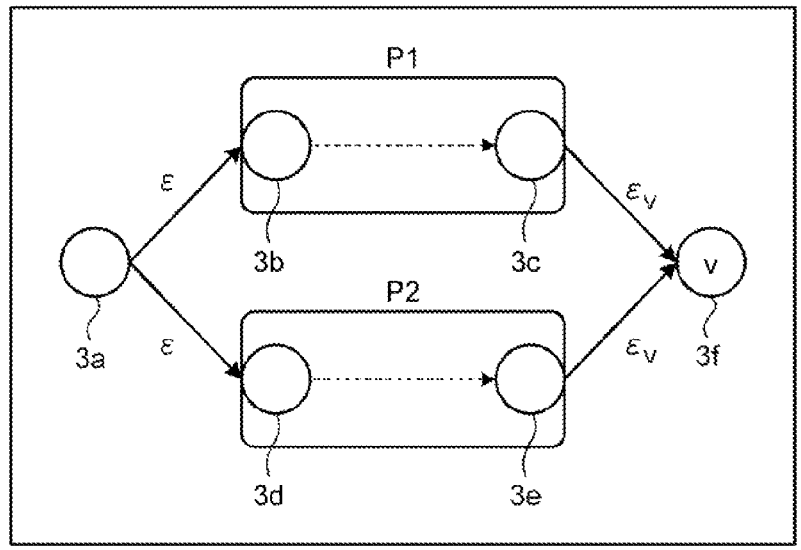
FIG. 7 is a third diagram for explaining the automaton construction method employed by the automaton building unit.

An automaton for a disjunction pattern is illustrated in FIG. 7. FIG. 7 illustrates an automaton for a disjunction pattern P=(P1vP2). The automaton building unit 150c joins a node 3a and a node 3b together, and the node 3a and a node 3d together. The automaton building unit 150c links the automaton A1 corresponding to the pattern P1 and the automaton A2 corresponding to the pattern P2 by $\epsilon$-transitions downstream of the node 3a and $\epsilon_v$-transitions upstream of a node 3f.

In FIG. 7, the transition from the node 3a to the node 3b and the transition from the node 3a to the node 3d are set to $\epsilon$-transitions. For instance, when transition from a node to the node 3a occurs, the transition from the node 3a to the node 3b and the transition from the node 3a to the node 3d are invoked.

In FIG. 7, transition from a node 3c to the node 3f and transition from a node 3e to the node 3f are set to $\epsilon_v$-transitions. For instance, when the event P1 causes transition from the node 3b to the node 3c to occur, the $\epsilon_v$-transition from the node 3c to the node 3f is invoked. Likewise, when the event P2 causes transition from the node 3d to the node 3e to occur, the $\epsilon_v$-transition from the node 3e to the node 3f is invoked. The node 3f is a node transition thereto starts after receiving any one of the $\epsilon_v$-transitions, which are the $\epsilon_v$-transition from the node 3c and the $\epsilon_v$-transition from the node 3e. Such the node 3f is referred to as an OR node.

Figure 8:
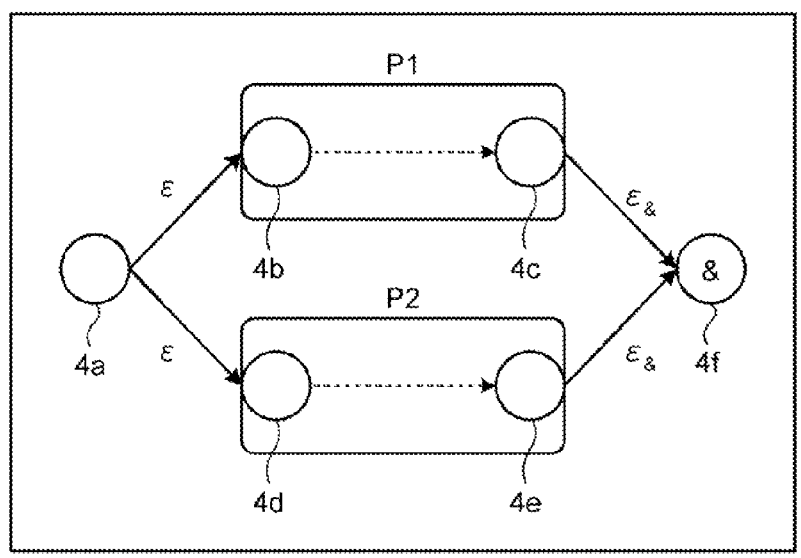
FIG. 8 is a fourth diagram for explaining the automaton construction method employed by the automaton building unit.

An automaton for a conjunction pattern is illustrated in FIG. 8. FIG. 8 illustrates an automaton for a conjunction pattern P=(P1&P2). The automaton building unit 150c joins a node 4a and a node 4b together, and the node 4a and a node 4d together. The automaton building unit 150c links the automaton A1 corresponding to the pattern P1 and the automaton A2 corresponding to the pattern P2 by $\epsilon$-transitions downstream of the node 4a and $\epsilon_\&$-transitions upstream of a node 4f.

In FIG. 8, the transition from the node 4a to the node 4b and the transition from the node 4a to the node 4d are set to $\epsilon$-transitions. Description about the $\epsilon$-transitions is similar to that pertaining to FIG. 7.

In FIG. 8, transition from a node 4c to the node 4f and transition from a node 4e to the node 4f are set to $\epsilon_\&$-transitions. For instance, when the event P1 causes transition from the node 4b to the node 4c to occur, the $\epsilon_\&$-transition from the node 4c to the node 4f is invoked. Likewise, when the event P2 causes transition from the node 4d to the node 4e to occur, the $\epsilon_\&$-transition from the node 4e to the node 4f is invoked. The node 4f is a node transition thereto starts after receiving both the $\epsilon_\&$-transitions, which are the $\epsilon_\&$-transition from the node 4c and the $\epsilon_\&$-transition from the node 4e. Such the node 4f is referred to as an AND node.

Figure 9:
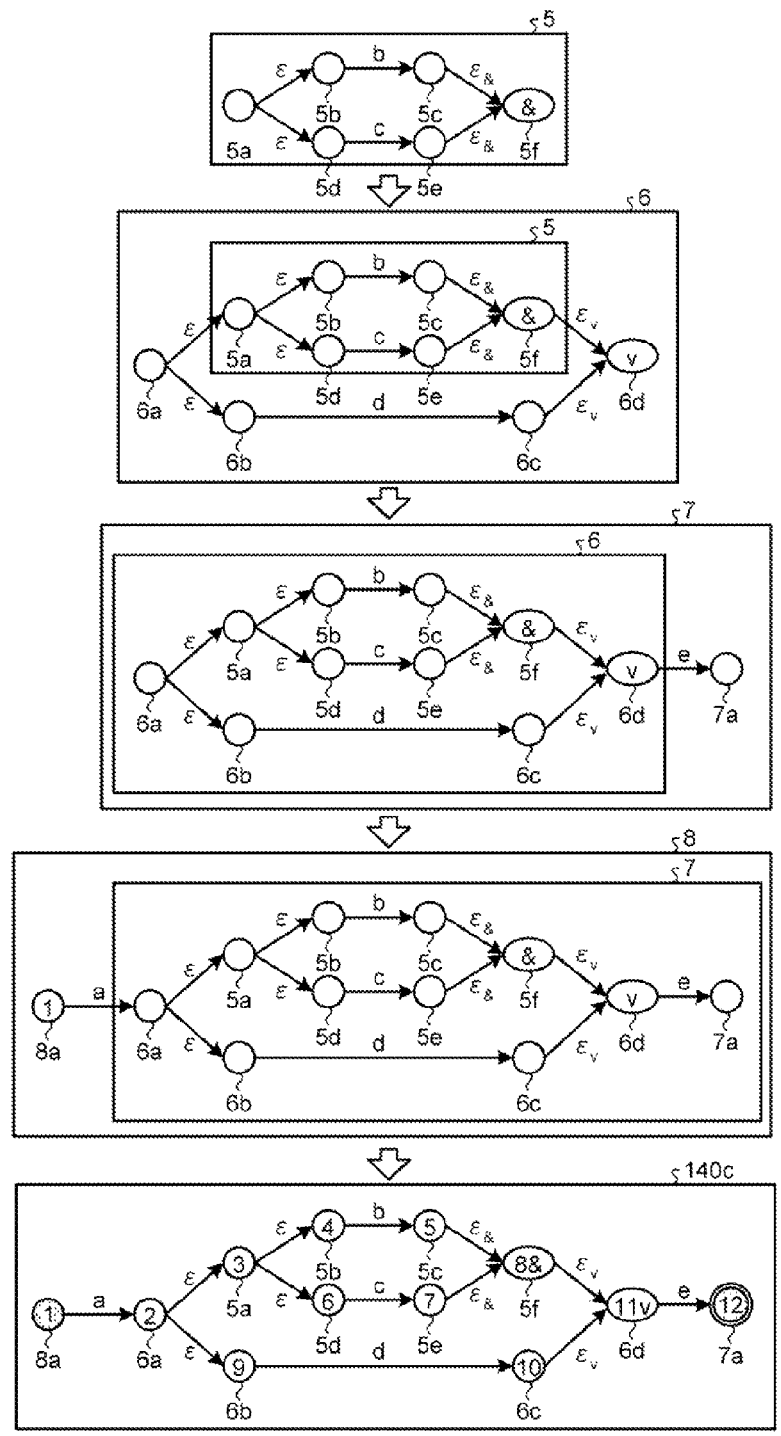
FIG. 9 is a diagram for explaining an automaton building process.

An example of a process, performed by the automaton building unit 150c, for building the automaton 140c from the parse tree 140b by using the automaton construction method illustrated in FIG. 5 to FIG. 8 will be described below. FIG. 9 is a diagram for explaining the automaton building process. The parse tree 140b, from which the automaton is to be built, is assumed to have the data structure illustrated in FIG. 4.

The automaton building unit 150c recursively performs, while bottom-up traversing the parse tree, a process of building an automaton for each computing node that has child nodes, both of which are event nodes, in the parse tree. Note that the node for which an automaton has been built is regarded as an event node.

This will be described specifically with reference to FIG. 4 and FIG. 9. In the parse tree 140b of FIG. 4, portions where a computing node has child nodes, both of which are event nodes, are the nodes 69, 62, and 63. The node 69 is a "&" computing node; accordingly, a pattern for the nodes 62, 63, and 69 is a conjunction pattern P=(b&c). Therefore, the automaton building unit 150c builds an automaton 5 for the conjunction pattern P=(b&c).

As illustrated in a top box in FIG. 9, the automaton building unit 150c joins a node 5a and a node 5b together, and the node 5a and a node 5d together. The automaton building unit 150c joins the node 5b and a node 5c together, and the node 5d and a node 5e together. The automaton building unit 150c joins the node 5c and a node 5f together, and the node 5e and the node 5f together. The automaton building unit 150c then builds the automaton 5, in which transition from the node 5b to the node 5c is caused by the event b, while transition from the node 5d to the node 5e is caused by the event c.

The automaton building unit 150c sets, in the automaton 5, transition from the node 5a to the node 5b and transition from the node 5a to the node 5d to $\epsilon$-transitions. The automaton building unit 150c sets transition from the node 5c to the node 5f and transition from the node 5e to the node 5f to $\epsilon_\&$-transitions. The automaton building unit 150c sets the node 5f as an AND node.

A process after the automaton 5 has been built by the automaton building unit 150c is described below. In the parse tree 140b of FIG. 4, portions where a computing node has child nodes, both of which are event nodes, are a group of nodes corresponding to the automaton 5 and the nodes 64 and 68. The node 68 is a "v" computing node; accordingly, a pattern for the node group corresponding to the automaton 5 and the nodes 64 and 68 is a disjunction pattern P=(P5vd). P5 corresponds to the nodes 62, 63, and 69 of the automaton 5. The automaton building unit 150c builds an automaton 6 for the disjunction pattern P=(P5vd).

As illustrated in a second box in FIG. 9, the automaton building unit 150c joins a node 6a and the node 5a together, the node 6a and a node 6b together, and the node 6b and a node 6c together. The automaton building unit 150c joins the node 5f and a node 6d together, and the node 6c and the node 6d together. The automaton building unit 150c builds the automaton 6, in which transition from the node 6b to the node 6c is caused by the event d. Description about the automaton 5 contained in the automaton 6 is similar to that described above.

The automaton building unit 150c sets, in the automaton 6, transition from the node 6a to the node 5a and transition from the node 6a to the node 6b to $\epsilon$-transitions. The automaton building unit 150c sets transition from the node 5f to the node 6d and transition from the node 6c to the node 6d to $\epsilon_v$-transitions. The automaton building unit 150c sets the node 6d as an OR node.

A process after the automaton 6 has been built by the automaton building unit 150c is described below. In the parse tree 140b of FIG. 4, portions where a computing node has child nodes, both of which are event nodes, are a group of nodes corresponding to the automaton 6 and the nodes 65 and 67. The node 67 is a "," computing node; accordingly, a pattern for the node group corresponding to the automaton 6 and the nodes 65 and 67 is a non-consecutive concatenation pattern P=(P6, e). P6 corresponds to the nodes 62, 63, 64, 68, and 69 of the automaton 6. The automaton building unit 150c builds an automaton 7 for the non-consecutive concatenation pattern P=(P6, e).

As illustrated in a third box in FIG. 9, the automaton building unit 150c joins the node 6d and a node 7a together. The automaton building unit 150c builds the automaton 7, in which transition from the node 6d to the node 7a is caused by the event e. Description about the automaton 6 contained in the automaton 7 is similar to that described above.

A process after the automaton 7 has been built by the automaton building unit 150c is described below. In the parse tree 140b of FIG. 4, portions where a computing node has child nodes, both of which are event nodes, are a group of nodes corresponding to the automaton 7 and the nodes 61 and 66. The node 66 is a "," computing node; accordingly, a pattern for the node group corresponding to the automaton 7 and the nodes 61 and 66 is a non-consecutive concatenation pattern P=(P7, a). P7 corresponds to the nodes 62, 63, 64, 65, 67, 68, and 69 of the automaton 7. The automaton building unit 150c builds an automaton 8 for the non-consecutive concatenation pattern P=(P7, a).

As illustrated in a fourth box in FIG. 9, the automaton building unit 150c joins a node 8a and the node 6a together. The automaton building unit 150c then builds the automaton 8, in which transition from the node 8a to the node 6a is caused by the event a. Description about the automaton 7 contained in the automaton 8 is similar to that described above.

A process after the automaton 8 has been built by the automaton building unit 150c is described below. The automaton building unit 150c specifies the node 8a, which is a start node of the automaton 8, as an initial state. The automaton building unit 150c also specifies the node 7a, which is an end node of the automaton 8, as a final state.

The automaton building unit 150c also assigns a state number to each of the nodes 5a to 5f, 6a to 6d, 7a, and 8a of the automaton 8. The automaton building unit 150c assigns the state numbers such that the state numbers are in ascending order on any path from the initial state to the final state. In the example illustrated in a fifth box in FIG. 9, the automaton building unit 150c assigns state numbers 1, 2, 3, 4, and 5 to the nodes 8a, 6a, 5a, 5b, and 5c. The automaton building unit 150c assigns state numbers 6, 7, and 8 to the nodes 5d, 5e, and 5f. The automaton building unit 150c assigns state numbers 9, 10, 11, and 12 to the nodes 6b, 6c, 6d, and 7a.

As described above, the automaton building unit 150c builds the automaton 140c from the parse tree 140b by performing the process illustrated in FIG. 9.

Figures 10, 11:
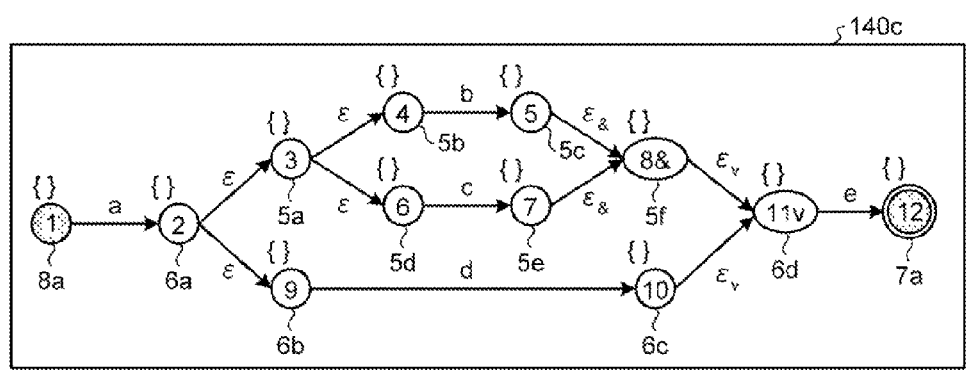
FIG. 10 is a diagram illustrating an example data structure of a node.
FIG. 11 is a first diagram for explaining processes of a matching unit.

An example data structure of a node contained in the automaton 140c illustrated in FIG. 9 is described below. FIG. 10 is a diagram illustrating an example data structure of a node. As illustrated in FIG. 10, the node includes a state number, a state type, a transition type, a pointer to a transition destination node, and an event set. When there are a plurality of transition destination nodes, there are a plurality of pointers to the transition destination nodes.

The state number is a unique number assigned to each node. The state type corresponds to a type of a state of a node. For instance, "initial state," "final state," "&-merged state," or "∨-merged state" is stored according to the node as the state type. Meanwhile, the &-merged state indicates that the node is an AND node. The ∨-merged state indicates that the node is an OR node.

As the transition type, a type of an event by which transition is to be caused, $\epsilon$-transition, $\epsilon_\&$-transition, or $\epsilon_\vee$-transition is stored according to the node. As each of the pointers to transition destination nodes, positional information about the transition destination node is stored. As the event set, a time of the event stream at a point in time when transition of the node of the initial state is invoked. As the event set, a time is stored by the matching unit 150d, which will be described later.

FIG. 10 illustrates the data structure of a node corresponding to the node 8a of FIG. 9. The state number of the node 8a is "1," while the state type of the same is "initial state." Transition of the node 8a is invoked by the event a; accordingly, the transition type is "event a." The state number of a transition destination node of the node 8a is "2"; accordingly, the pointer to the transition destination node is "positional information about the node whose state number is 2."

Description with reference to FIG. 2 is continued. The matching unit 150d is a processing unit that performs matching of the event stream 140d by utilizing the automaton 140c. The matching unit 150d provides a notification of a matching result to the user terminal 50. For instance, the matching result includes a start time and an end time of the event pattern 140a on the event stream 140d.

Processes of the matching unit 150d will be described specifically. While traversing the events of the event stream 140d one by one, the matching unit 150d performs comparison with each node of the automaton 140c, and invokes a normal transition, an $\epsilon$-transition, an $\epsilon_\&$-transition, or an $\epsilon_\vee$-transition depending on the event. The matching unit 150d enters a time of the event stream 140d at a point in time when transition from the initial state is started to an event set of the initial state. The matching unit 150d overwrites an event set of a transition destination with an event set of a transition source each time when the matching unit 150d invokes an $\epsilon$-transition, an $\epsilon_\&$-transition, or an $\epsilon_\vee$-transition.

Meanwhile, as for an AND node of the automaton 140c, the matching unit 150d causes transition to start after all $\epsilon_\&$-transitions have been invoked. The matching unit 150d overwrites the event set of the AND node with a value that is common to event sets of transition source nodes of the $\epsilon_\&$-transitions.

As for an OR node of the automaton 140c, the matching unit 150d causes transition to start after any one of $\epsilon_\vee$-transitions has been invoked. The matching unit 150d overwrites the event set of the OR node with all values each contained in at least any one of event sets of transition source nodes of the $\epsilon_\vee$-transitions.

The matching unit 150d assumes that matching is completed at a point in time when transition to the final state is invoked, and outputs a start time and an end time.

The processes of the matching unit 150d will be described using the drawings. FIG. 11 to FIG. 19 are diagrams for explaining the processes of the matching unit. In the description using FIG. 11 to FIG. 19, each node is distinguished by a state number. Hereinafter, nodes with state numbers 1 to 12 are referred to as states 1 to 12. The event stream illustrated in FIG. 3 is used as the event stream 140d, against which the automaton 140c is to be compared.

Description about FIG. 11 is provided below. The matching unit 150d assigns empty sets as event sets of the states 1 to 12. In FIG. 11, "{ }" indicates an event set corresponding to each of the states. As illustrated in FIG. 11, each of the event sets is an empty set.

Figure 12:
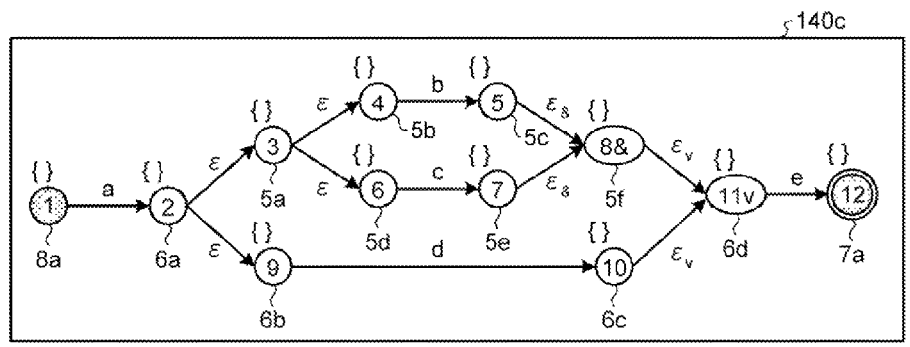
FIG. 12 is a second diagram for explaining the processes of the matching unit.

Provided below is description of FIG. 3 and FIG. 12. The matching unit 150d acquires the event "y" of time 1 from the event stream 140d. The automaton 140c does not include a normal transition associated with "y"; accordingly, no normal transition is invoked. The matching unit 150d invokes $\epsilon$-transitions, $\epsilon_\&$-transitions, and $\epsilon_\vee$-transitions. The event set of each of the states is the empty set; accordingly, the event set of each state remains being the empty set.

The matching unit 150d acquires the event "z" of time 2 from the event stream 140d. The automaton 140c does not include a normal transition associated with "z"; accordingly, no normal transition is invoked. The matching unit 150d invokes $\epsilon$-transitions, $\epsilon_\&$-transitions, and $\epsilon_\vee$-transitions. The event set of each of the states is the empty set; accordingly, the event set of each state remains being the empty set.

Figure 13:
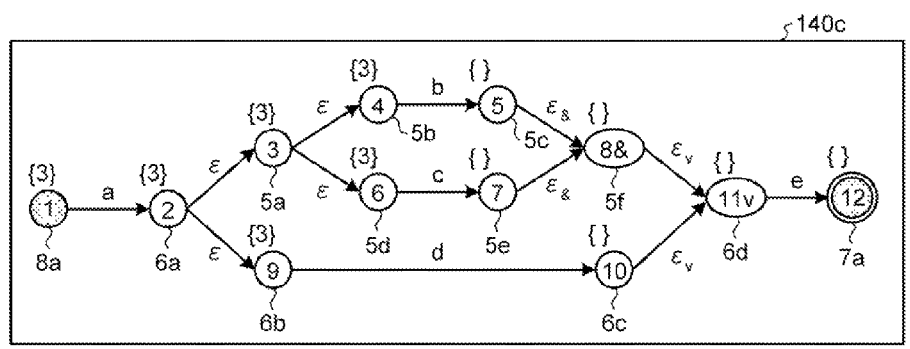
FIG. 13 is a third diagram for explaining the processes of the matching unit.

Provided below is description of FIG. 3 and FIG. 13. The matching unit 150d acquires the event "a" of time 3 from the event stream 140d. The event "a" triggers a normal transition at the state 1. The matching unit 150d assigns "3" to the event set of the state 1. The event a invokes a normal transition, and "3" is assigned to the event set of the state 2.

The matching unit 150d overwrites the event sets of the states 3 and 9 with "3," which is the value of the event set of the state 2 according to $\epsilon$-transitions from the state 2. Similarly, the matching unit 150d overwrites the event sets of the states 4 and 6 with "3," which is the event set of the state 3, according to $\epsilon$-transitions from the state 3.

Figure 14:
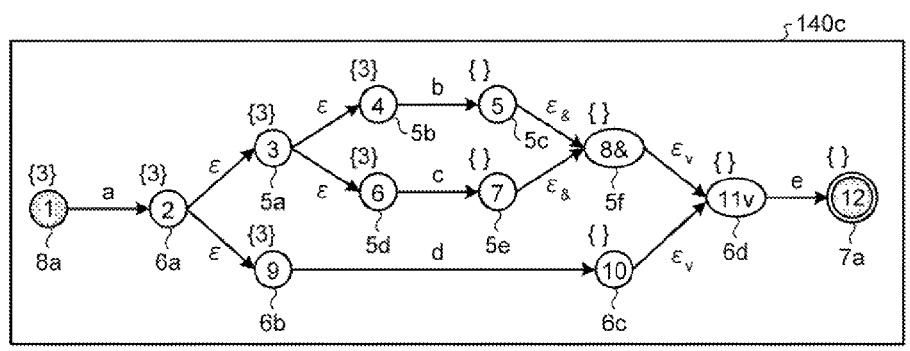
FIG. 14 is a fourth diagram for explaining the processes of the matching unit.

Provided below is description of FIG. 3 and FIG. 14. The matching unit 150d acquires the events "z," "y," "x," and "z" of times 4, 5, 6, and 7 from the event stream 140d one by one. The automaton 140c does not include a normal transition associated with "z," "y," "x," or "z"; accordingly, no normal transition is invoked. The matching unit 150d invokes $\epsilon$-transitions, $\epsilon_\&$-transitions, and $\epsilon_\vee$-transitions. The event set of each of the states 5, 7, 8, and 10 is the empty set; accordingly, the event sets of the states 11 and 12 remain being the empty sets.

Figure 15:
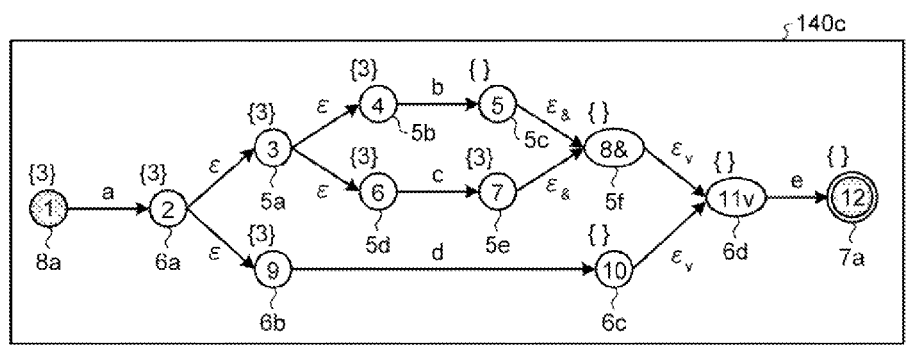
FIG. 15 is a fifth diagram for explaining the processes of the matching unit.

Provided below is description of FIG. 3 and FIG. 15. The matching unit 150d acquires the event c of time 8 from the event stream 140d. The event "c" triggers a normal transition at the state 6. The matching unit 150d overwrites the event set of the state 7 with the event set "3" of the state 6.

The matching unit 150d calculates a product set of the event set of the state 5 and the event set of the state 7 and overwrites the state 8 with a result of the calculation. The product set of the event set of the state 5 and the event set of the state 7 is an empty set; accordingly, the event set of the state 8 remains being the empty set. The event sets of the states 10, 11, and 12 also remain being the empty set.

Figure 16:
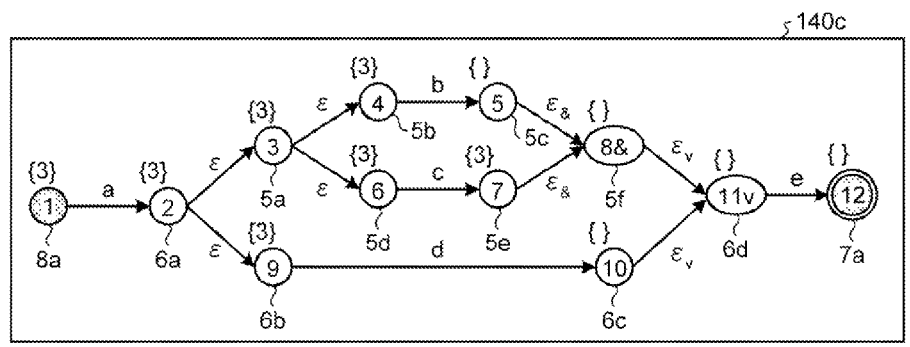
FIG. 16 is a sixth diagram for explaining the processes of the matching unit.

Provided below is description of FIG. 3 and FIG. 16. The matching unit 150d acquires the events "z" and "z" of times 9 and 10 from the event stream 140d one by one. The automaton 140c does not include a normal transition associated with "z," "z"; accordingly, no normal transition is invoked. The matching unit 150d invokes $\epsilon$-transitions, $\epsilon_\&$-transitions, and $\epsilon_v$-transitions. The product set of the event set of the state 5 and the event set of the state 7 is an empty set; accordingly, the event set of the state 8 remains being the empty set. The event sets of the states 10, 11, and 12 also remain being the empty set.

Figure 17:
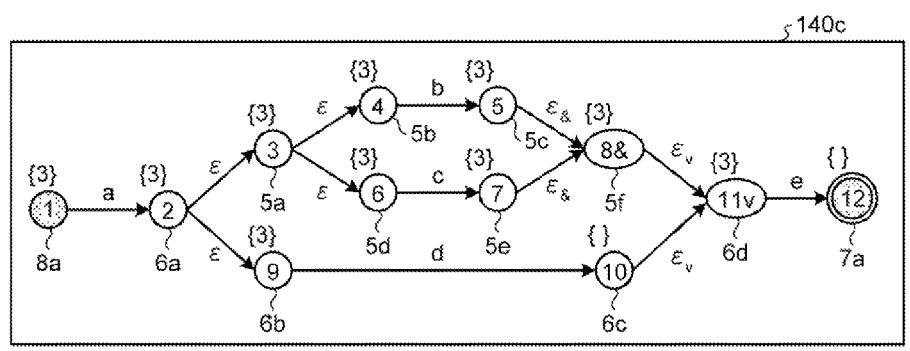
FIG. 17 is a seventh diagram for explaining the processes of the matching unit.

Provided below is description of FIG. 3 and FIG. 17. The matching unit 150d acquires the event b of time 11 from the event stream 140d. The event "b" triggers a normal transition at the state 4. The matching unit 150d overwrites the event set of the state 5 with the event set "3" of the state 4.

The matching unit 150d calculates a product set of the event set of the state 5 and the event set of the state 7 and overwrites the state 8 with a result of the calculation. The product set of the event set of the state 5 and the event set of the state 7 is "3." Accordingly, the matching unit 150d overwrites the event set of the state 8 with "3."

The matching unit 150d calculates a union of the event set of the state 8 and the event set of the state 9 and overwrites the state 11 with a result of the calculation. The union of the event set of the state 8 and the event set of the state 10 is "3." Accordingly, the matching unit 150d overwrites the event set of the state 11 with "3." The event sets of the states 10 and 12 remain being the empty set.

Figure 18:
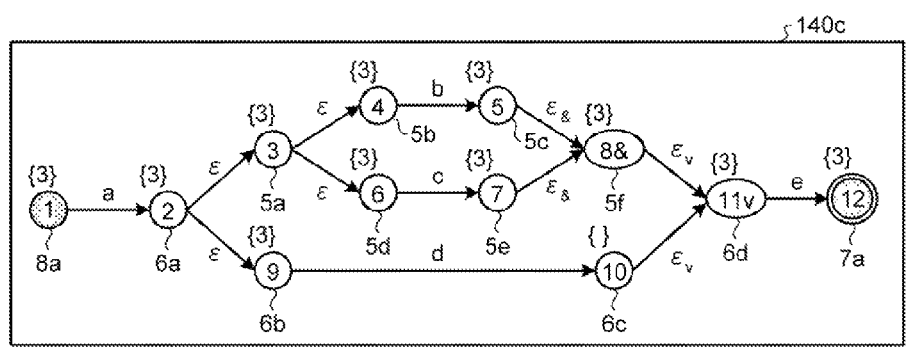
FIG. 18 is an eighth diagram for explaining the processes of the matching unit.

Provided below is description of FIG. 3 and FIG. 18. The matching unit 150d acquires the event e of time 12 from the event stream 140d. The event "e" triggers a normal transition at the state 11. The matching unit 150d overwrites the event set of the state 12 with the event set "3" of the state 11.

The matching unit 150d outputs a matching result because a normal transition to the final state 11 has occurred. Of the matching result, a start time is "3," which is the value of the event set of the state 11, while an end time is "12," which is time when the normal transition to the state 11 has occurred. Although the matching unit 150d invokes $\epsilon$-transitions, $\epsilon_\&$-transitions, and $\epsilon_v$-transitions, event sets of the other states remain unchanged.

Figure 19:
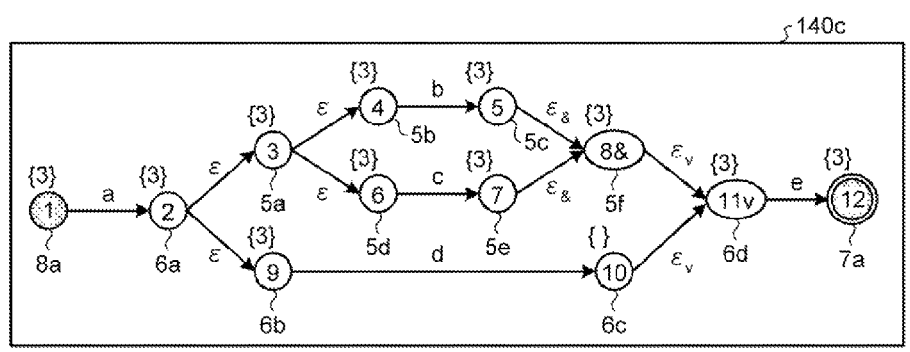
FIG. 19 is a ninth diagram for explaining the processes of the matching unit.

Provided below is description of FIG. 3 and FIG. 19. The matching unit 150d acquires the events "z" and "y" of times 13 and 14 from the event stream 140d one by one. The automaton 140c does not include a normal transition associated with "z" or "y"; accordingly, no normal transition is invoked. Although the matching unit 150d invokes $\epsilon$-transitions, $\epsilon_\&$-transitions, and $\epsilon_v$-transitions, the event set of each state remains unchanged.

The matching unit 150d performs matching of the event stream 140d by utilizing the automaton 140c by performing the processes illustrated in FIG. 11 to FIG. 19 described above. The matching unit 150d notifies the user terminal 50 of the matching result. The matching unit 150d may cause the display unit 130 to display the matching result.

Figure 20:
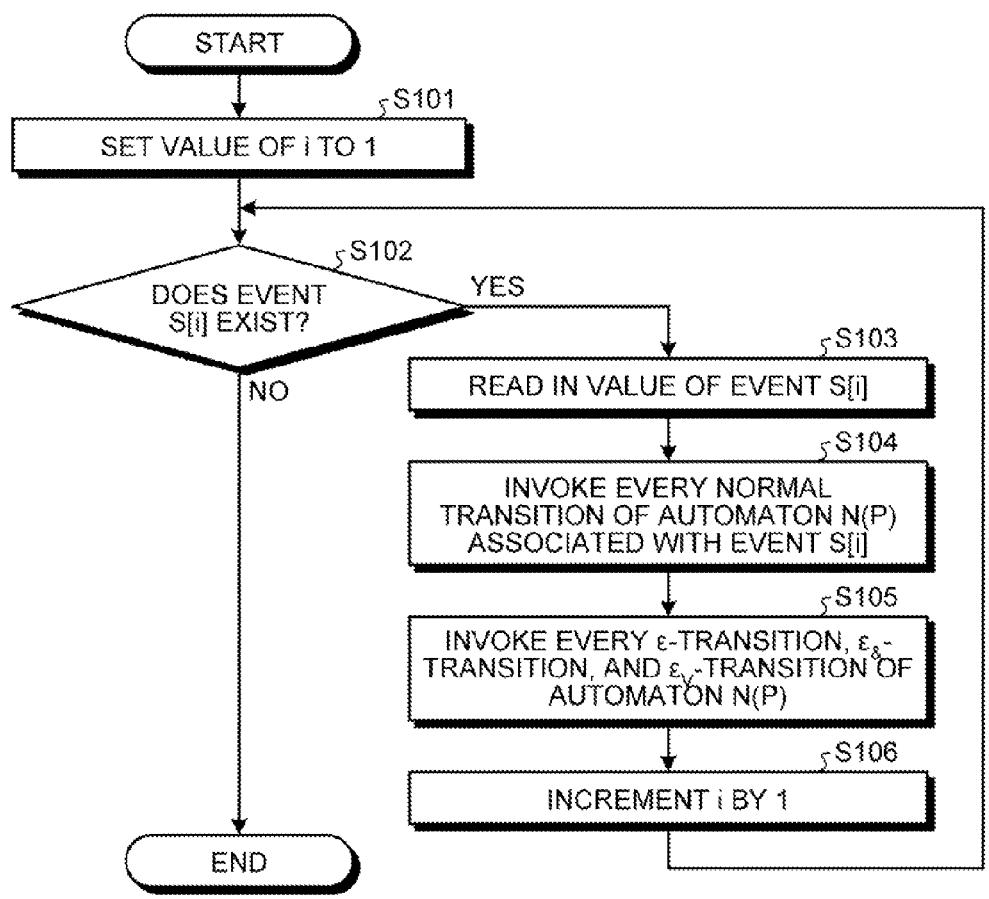
FIG. 20 is a flowchart illustrating a process procedure for the matching device.

A process procedure for the matching device 100 illustrated in FIG. 2 is described below. FIG. 20 is a flowchart illustrating the process procedure for the matching device. For instance, the processes illustrated in FIG. 20 are performed in response to that, after the event pattern 140a and the event stream 140d have been acquired, the automaton 140c has been built.

As illustrated in FIG. 20, the matching device 100 sets a value of i to 1 (S101) and determines whether an event S[i] exists (S102). Meanwhile, the event S[i] corresponds to an event of time i of the event stream 140d.

If the event S[i] does not exist (No at S102), the matching device 100 exits the process. If the event S[i] exists (Yes at S102), the matching device 100 reads in value of event S[i] (S103).

The matching device 100 invokes every normal transition of an automaton N(P) associated with the event S[i] (S104). The automaton N(P) corresponds to the automaton 140c.

The matching device 100 invokes every $\epsilon$-transition, $\epsilon_\&$-transition, and $\epsilon_v$-transition of the automaton N(P) (S105). The matching device 100 increments by 1 (S106), and the process goes to S102.

Figure 21:
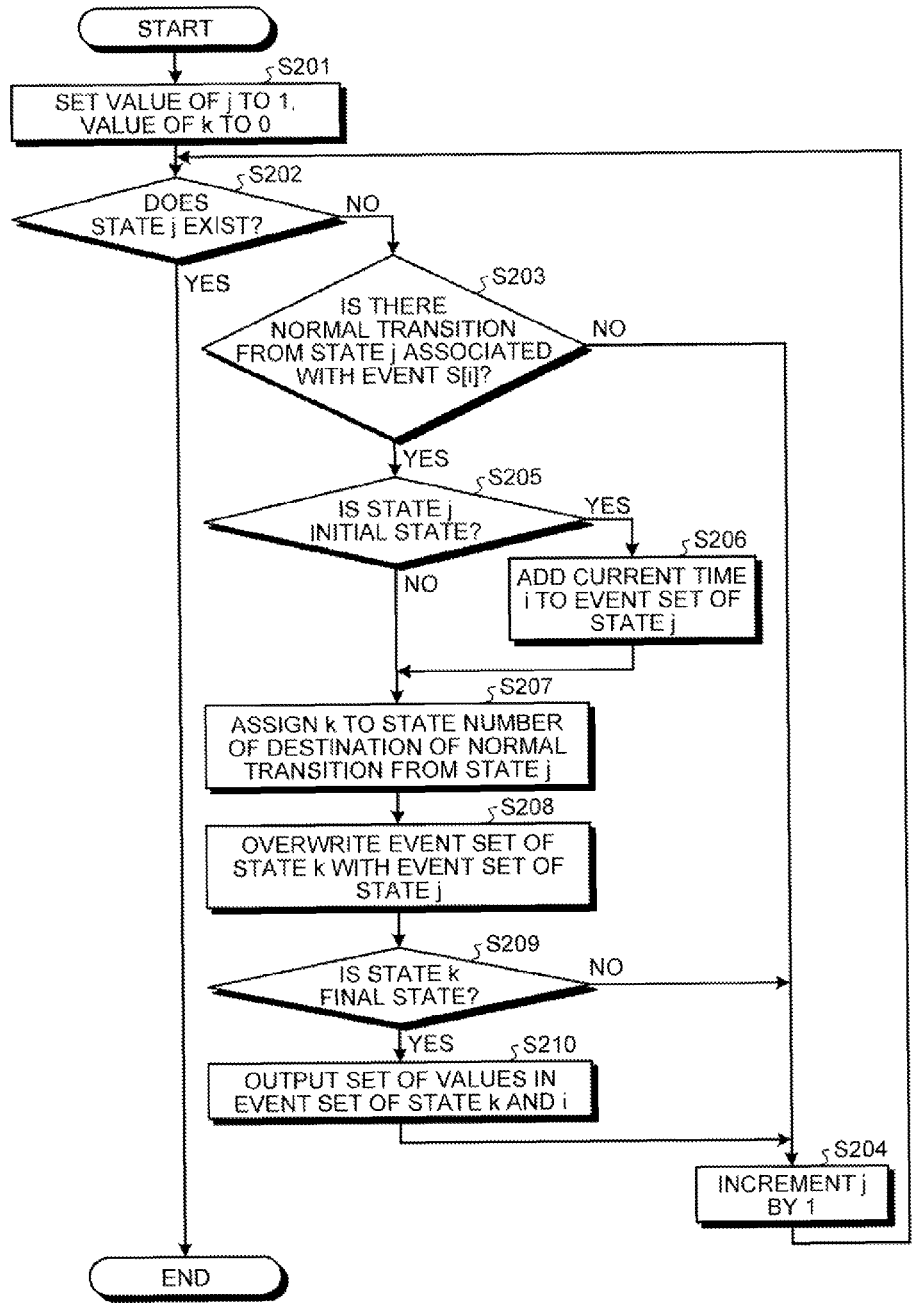
FIG. 21 is a flowchart illustrating a process procedure for a process for invoking a normal transition.

Next, the process illustrated in S104 of FIG. 20 for invoking the normal transition is described below. FIG. 21 is a flowchart illustrating a process procedure for the process for invoking the normal transition. As illustrated in FIG. 21, the matching device 100 sets a value of j to 1 and a value of k to 0 (S201). Note that j corresponds to a state number of the automaton 140c. Likewise, k corresponds to a state number of a transition destination.

If the state j does not exist (Yes at S202), the matching device 100 exits the process. If the state j exists (No at S202), the matching device 100 determines whether there is a normal transition from the state j associated with the event S[i] (S203).

If there is no normal transition from the state j associated with the event S[i] (No at S203), the matching device 100 increments j by 1 (S204), and the process goes to S202.

If there is a normal transition from the state j associated with the event S[i] (Yes at S203), the matching device 100 determines whether the state j is the initial state (S205).

If the state j is the initial state (Yes at S205), the matching device 100 adds i, which is the current time, to the event set of the state j (S206), and the process goes to S207.

The matching device 100 assigns k to the state number of a destination of a normal transition from the i (S207), and overwrites the event set of the state k with the event set of the state j (S208). If the state k is not the final state (No at S209), the matching device 100 goes to S204.

If the state j is the final state (Yes at S209), the matching device 100 outputs a set of values in the event set of the state k and i (S210), and the process goes to S204.

Figure 22:
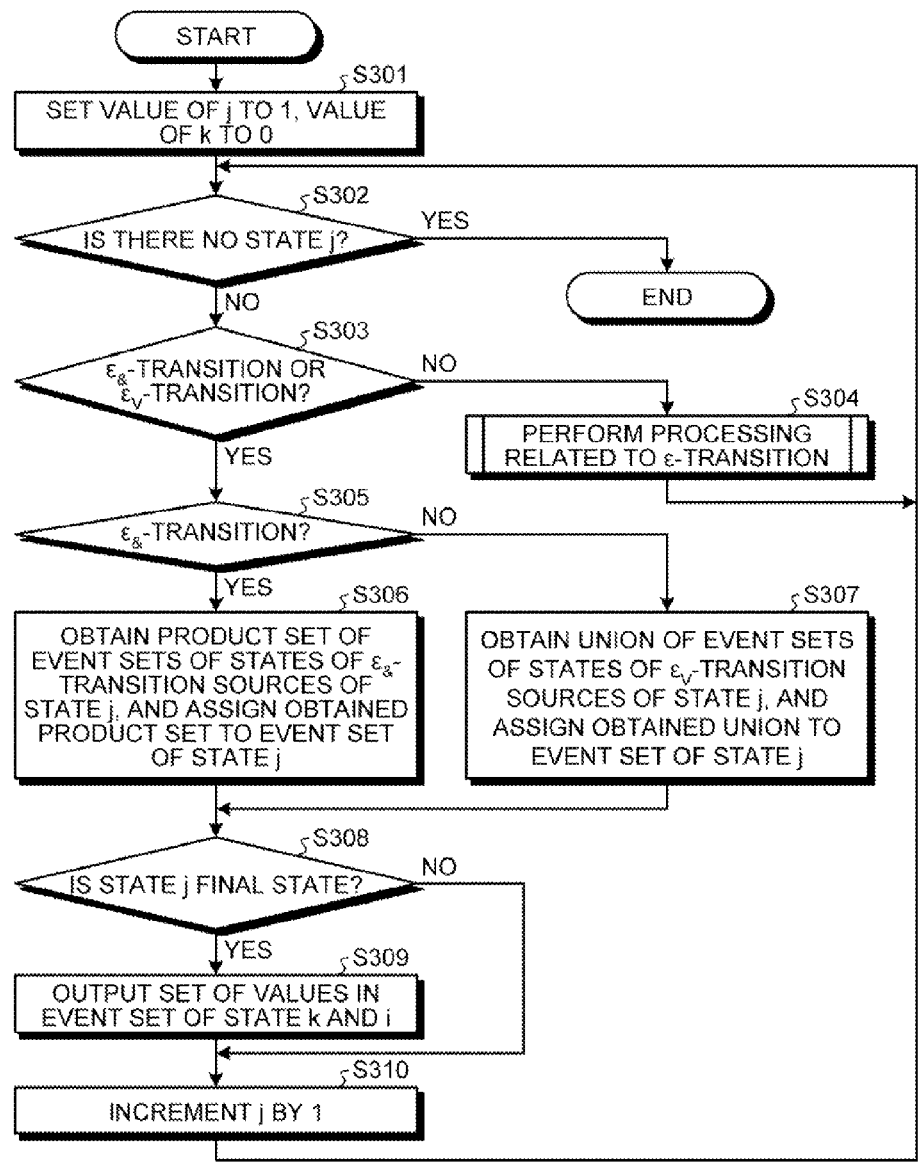
FIG. 22 is a flowchart illustrating a process procedure for a process for invoking an $\epsilon$-transition, an $\epsilon_{\&}$-transition, and an $\epsilon_{\vee}$-transition.
Figures 26, 27:
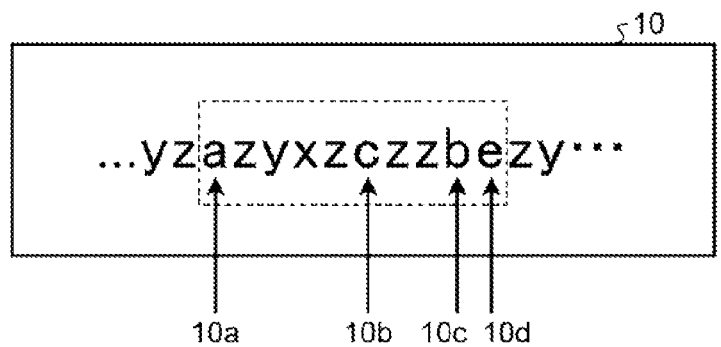
FIG. 26 is a diagram for explaining a conventional technique.
FIG. 27 is a diagram where events and descriptions about the events are associated with each other.
Figure 28:
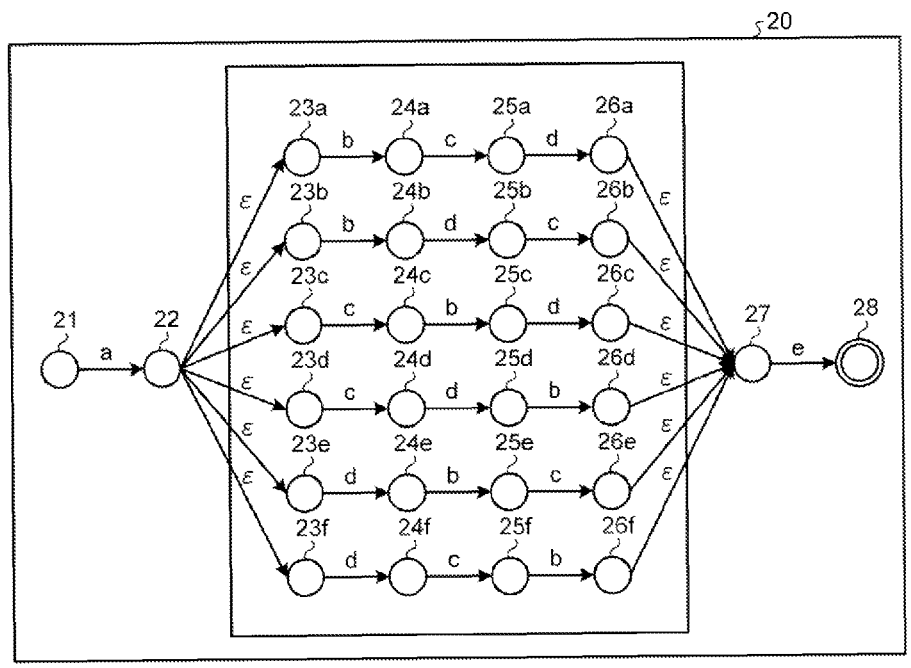
FIG. 28 is a diagram illustrating a conventional automaton built from an event pattern.

Next, the process illustrated in S105 of FIG. 20 for invoking the $\epsilon$-transition, the $\epsilon_\&$-transition, and the $\epsilon_v$-transition is described below. FIG. 22 is a flowchart illustrating a process procedure for the process for invoking the $\epsilon$-transition, the $\epsilon_\&$-transition, and the $\epsilon_v$-transition.

As illustrated in FIG. 22, the matching device 100 sets the value of j to 1 and the value of k to 0 (S301). If there is no state j (Yes at S302), the matching device 100 exits the process.

If there is the state j (No at S302), the matching device 100 determines whether the transition is an $\epsilon_\&$-transition or an $\epsilon_v$-transition (S303). If the transition is neither an $\epsilon_\&$-transition nor an $\epsilon_v$-transition (No at S303), the matching device 100 performs a process related to an $\epsilon$-transition (S304), and the process goes to S302.

If the transition is an $\epsilon_\&$-transition or an $\epsilon_v$-transition (Yes at S303), the matching device 100 determines whether the transition is an $\epsilon_\&$-transition (S305). If the transition is an $\epsilon_\&$-transition (Yes at S305), the matching device 100 obtains a product set of event sets of states of $\epsilon_\&$-transition sources of the state j, and assigns the obtained product set to the event set of the state j (S306).

If the transition is an $\epsilon_v$-transition (No at S305), the matching device 100 obtains a union of event sets of states of $\epsilon_v$-transition sources of the state j, and assigns the obtained union to the event set of the state j (S307).

If the state j is the final state (Yes at S308), the matching device 100 outputs a set of values in the event set of the state j and i (S309), increments j by 1 (S310), and the process goes to S302.

If the state j is not the final state (No at S308), the process goes to S310.

Next, the process procedure illustrated in S304 of FIG. 22 for the process related to the $\epsilon$-transition is described below. FIG. 23 is a flowchart illustrating the process procedure for the process related to the $\epsilon$-transition. When there is no $\epsilon$-transition from the state j (No at S401), the matching device 100 goes to S407.

When there is an $\epsilon$-transition from the state j (Yes at S401), the matching device 100 assigns one of not-yet-processed state numbers of transition destinations of the state j to k (S402).

The matching device 100 overwrites the event set of the state k with the event set of the state j (S403) and determines whether the state k is the final state (S404). If the state k is not the final state (No at S404), the matching device 100 goes to S406.

If the state k is the final state (Yes at S404), the matching device 100 outputs a set of values in the event set of the state k and i (S405). If all the $\epsilon$-transitions from the state j have not been processed yet (No at S406), the matching device 100 goes to S402.

If all the $\epsilon$-transitions from the state j have been processed (Yes at S406), the matching device 100 increments j by 1 (S407), and exits the process.

Next, effects yielded by the matching device 100 according to the present embodiment are described below. The matching device 100 builds the parse tree 140b from the event pattern 140a. The matching device 100 builds the automaton 140c by, while traversing the parse tree 140b, joining child nodes of an AND node in parallel to the AND node and joining child nodes of an OR node in parallel to the OR node. The matching device 100 performs matching of determining whether the event stream 140d includes the event pattern 140a by comparing the event stream 140d with the automaton 140c. The matching device 100 causes transition to the AND node of the automaton 140c to start after transitions from all transition source nodes have been invoked. The matching device 100 causes transition to the OR node of the automaton 140c to start after a transition from any one of transition source nodes has been invoked. The matching device 100 can perform matching without involving all combinations of occurrence order of events contained in a conjunction pattern(s), which is an event pattern(s) expressed with "&". Accordingly, the matching device 100 can perform event pattern matching efficiently.

Furthermore, when a normal transition from an initial state occurs, the matching device 100 stores time of the event stream in an event set, and stores time of an event set of a transition source node in an event set of a transition destination node each time. When transition to the final state has occurred, the matching device 100 outputs a time of an event, from which transition to the final state has occurred, and a time of the event set that is associated with the time. Accordingly, the matching device 100 is capable of outputting the start time and the end time of the event pattern in the event stream as a matching result.

Meanwhile, the processes illustrated in FIG. 2 for the matching unit 150d are an example, and the processes can be extended in various manners. First, second, third, and fourth alternative processes of the matching unit 150d will be described below one by one.

The first alternative process is described below. The matching unit 150d may employ a maximum matching interval. For instance, when the number of events between a start time and an end time is smaller than a threshold value, the matching unit 150d outputs a pair of the start time and the end time as a matching result. Causing the matching unit 150d to perform such a process as described above makes it possible to avoid outputting a result of matching performed with an excessively large interval between the start time and the end time.

The second alternative process is described below. In the embodiment described above, time is stored in an event set of a initial state every time a normal transition from the initial state occurs. Accordingly, an event set of each state can contain a plurality of times. In contrast, in the second alternative process, the matching unit 150d stores a single time of a latest event that has reached a certain state in the event set.

For instance, when the event a occurs at time 3 and a normal transition from the state 1 is invoked, the matching unit 150d assigns "3" to the event set of the state 1. Thereafter, when the event a occurs again at time 15 and a normal transition from the state 1 is invoked, the matching unit 150d overwrites the event set of the state 1 with "15." The matching unit 150d assigns the time of the latest event also to event sets of the other states. Causing the matching unit 150d to perform such a process as described above makes it possible to output only a result of matching performed with a minimum interval between the start time and the end time.

The third alternative process is described below. The matching unit 150d stores a smallest value of values, which are contained in a product set of an AND node, in an event set of the AND node. For instance, in FIG. 19, in a situation where the event set of the state 5 is "3" and the event set of the state 7 is "15," "3" is assigned to the event set of the state 8.

The matching unit 150d stores a largest value of values, which are contained in a union of sets of an OR node, in an event set of the OR node. For instance, in FIG. 19, in a situation where the event set of the state 8 is "3" and the event set of the state 10 is "16," "16" is assigned to the event set of the state 11. Causing the matching unit 150d to perform such a process as described above makes it possible to further enhance computation efficiency and memory efficiency of the storage unit.

The fourth alternative process is described below. The matching unit 150d may output the pair of the start time and the end time only when transition to the final state occurs and a time of the event of the final state is replaced by another value.

Time complexities and space complexities of the conventional technique, the matching device according to the embodiment, and a matching device, which is a modification of the matching device, are described below. FIG. 24 is a diagram illustrating a result of comparison among the time complexities and the space complexities. In FIG. 24, m denotes an event pattern length, n denotes an event stream length, and w denotes a maximum reference interval.

As illustrated in FIG. 24, with the conventional technique, time complexity in a case where no maximum matching interval is provided is "$O(mn^2)$," while time complexity in a case where the maximum matching interval is provided is "O(mnw)." With the conventional technique, space complexity in the case where no maximum matching interval is provided is "O(m!n)," while space complexity in a case where the maximum matching interval is provided is "O(m!w)."

According to the present embodiment, time complexity in a case where no maximum matching interval is provided is "O(mn$^2$)," while time complexity in a case where the maximum matching interval is provided is "O(mnw)." According to the present embodiment, space complexity in the case where no maximum matching interval is provided is "O(mn)," while space complexity in a case where the maximum matching interval is provided is "O(mw)." Thus, the present embodiment achieves substantial reduction in space complexity as compared with the conventional technique.

According to the modification of the embodiment for outputting only minimum matching by employing the second, third, or fourth alternative process, time complexity in a case where no maximum matching interval is provided is "O(mn)," while time complexity in the case where the maximum matching interval is provided is "O(mw)." According to the modification of the embodiment for outputting only minimum matching by using the second, third, or fourth alternative process, space complexity in the case where no maximum matching interval is provided is "O(m)," while space complexity in the case where the maximum matching interval is provided is "O(m)." Thus, the modification can improve both time complexity and space complexity as compared with the embodiment.

Next, an example of a computer that executes a matching program that implements a function similar to that of the matching device 100 illustrated in FIG. 2 is described below. FIG. 25 is a diagram illustrating an example of the computer that executes the matching program.

As illustrated in FIG. 25, a computer 200 includes a CPU 201 that executes various computing processes, an input device 202 that receives data inputs from a user, and a display 203. The computer 200 further includes a reading device 204 that reads in a program and the like from a storage medium and an interface device 205 that exchanges data with another computer via a network. The computer 200 further includes RAM 206 that temporarily stores various types of information pieces and a hard disk device 207. The devices 201 to 207 are connected to a bus 208.

The hard disk device 207 stores a parse-tree building program 207a, an automaton generating program 207b, and a matching program 207c. The CPU 201 reads out the programs 207a to 207c and loads them into the RAM 206. The parse-tree building program 207a functions as a parse-tree building process 206a. The automaton generating program 207b functions as an automaton building process 206b. The matching program 207c functions as a matching process 206c.

For instance, the parse-tree building process 206a corresponds to the parse-tree building unit 150b. The automaton building process 206b corresponds to the automaton building unit 150c. The matching process 206c corresponds to the matching unit 150d.

The programs 207a to 207c are not necessarily stored in the hard disk device 207 in advance. For instance, there can be employed a configuration where the programs are stored in advance in a "portable physical medium," such as a flexible disk (FD), compact disc (CD)-ROM, a digital versatile disc (DVD), a magneto optical disk, or an integrated circuit (IC) card to be inserted into the computer 200. The computer 200 reads out the programs 207a to 207c therefrom and executes the programs.

A matching device according to an aspect of the present invention yields an effect that event pattern matching can be performed efficiently by utilizing an automaton.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A matching device comprising:
a processor; and
a memory, wherein the processor executes:
building a parse tree based on an event pattern representing an occurrence order of a first pattern, a second pattern, and a third pattern,
the first pattern being a single event,
the second pattern being a pattern where every event of a plurality of events occurs,
the third pattern being a pattern where any one event of a plurality of events occurs,
the parse tree associating an event node, an AND node representing a relationship between the events in the second pattern, and an OR node representing a relationship between the events of the third pattern, together in a tree structure;
building an automaton by performing a process of joining first child nodes of the AND node in parallel to the AND node, a process of setting a first transition from the first child node to the AND node, a process of joining second child nodes of the OR node in parallel to the OR node and a process of setting a second transition from the second child node to the OR node, while traversing the parse tree, wherein the first transition is invoked when the event of the first child node has occurred and the second transition is invoked when the event of the second child node has occurred; and
performing matching of determining whether an event stream that includes a plurality of event occurrence orders includes the event pattern by
comparing the event stream with the automaton in succession,
causing a transition to the AND node of the automaton to start after two of the first transitions to the AND node have been invoked, and
causing a transition to the OR node of the automaton to start after one of the second transitions to the OR node has been invoked.

2. The matching device according to claim 1, wherein the performing determines a start time of the event stream at which a transition has started, stores, every time a transition between nodes occurs in the automaton, the start time in an event set of a destination node of the transition, and, upon reaching a final state of the automaton, outputs an end time of the event stream, at which a transition to the final state has occurred, and the start time associated with the end time.

3. The matching device according to claim 2, wherein the performing outputs the start time and the end time when number of events between an event corresponding to the start time in the event stream and an event corresponding to the end time is smaller than a threshold value.

4. The matching device according to claim 2, wherein when transitions to the AND node occur from different nodes of the automaton, the performing stores a smaller one of start times stored in event sets of the different nodes in an event set of the AND node.

5. The matching device according to claim 2, wherein when transitions to the OR node occur from different nodes of the automaton, the performing stores a larger one of start times stored in event sets of the different nodes in an event set of the OR node.

6. A non-transitory computer readable storage medium having stored therein a matching program, the matching program causing a computer to execute a process comprising:
   building a parse tree based on an event pattern representing an occurrence order of a first pattern, a second pattern, and a third pattern,
   the first pattern being a single event,
   the second pattern being a pattern where every event of a plurality of events occurs,
   the third pattern being a pattern where any one event of a plurality of events occurs,
   the parse tree associating an event node, an AND node representing a relationship between the events in the second pattern, and an OR node representing a relationship between the events of the third pattern together in a tree structure;
   building an automaton by performing, while traversing the parse tree stored in the storage device, a process of joining first child nodes of the AND node in parallel to the AND node, a process of setting a first transition from the first child node to the AND node, a process of joining second child nodes of the OR node in parallel to the OR node and a process of setting a second transition from the second child node to the OR node;
   storing the automaton in a storage device; and
   performing matching of determining whether an event stream that includes a plurality of event occurrence orders includes the event pattern by
   comparing the event stream with the automaton in succession,
   causing a transition to the AND node of the automaton to start after two of the first transitions to the AND node have been invoked, and
   causing a transition to the OR node of the automaton to start after one of the second transitions to the OR node has been invoked.

7. The non-transitory computer readable storage medium according to claim 6, wherein the performing matching includes: determining a start time of the event stream where a transition has started; storing, every time a transition between nodes occurs in the automaton, the start time in an event set of a destination node of the transition, and upon reaching a final state of the automaton, outputting an end time of the event stream, at which a transition to the final state has occurred, and the start time associated with the end time.

8. The non-transitory computer readable storage medium according to claim 7, wherein the performing matching includes outputting the start time and the end time when number of events between an event corresponding to the start time of the event stream and an event corresponding to the end time is smaller than a threshold value.

9. The non-transitory computer readable storage medium according to claim 7, wherein the performing matching includes, when transitions to the AND node occur from different nodes of the automaton, storing a smaller one of start times stored in event sets of the different nodes in an event set of the AND node.

10. The non-transitory computer readable storage medium according to claim 7, wherein the performing matching includes, when transitions to the OR node occur from different nodes of the automaton, storing a larger one of start times stored in event sets of the different nodes in an event set of the OR node.

* * * * *